Patented June 8, 1948

2,443,138

UNITED STATES PATENT OFFICE 2,443,138

PRESERVATION OF BAKED CEREAL FOOD

Eugene G. Holden, Jr., Lemoore, Calif., assignor to American Colloid Company, Chicago, Ill., a corporation of South Dakota No Drawing. Application November 6, 1943, Serial No. 509,275

13 Claims. (Cl. 99—90)

This application is a continuation in part of my copending application Serial No. 311,110, filed December 27, 1939, now abandoned.

This invention relates to the preservation of food stuffs and particularly to the production of edible foods having improved keeping qualities.

One of the objects of my invention is to provide prepared foods characterized by increased resistance to the changes of physical and chemical qualities and taste which otherwise develop in the food while it awaits consumption. A specific object is to improve the keeping qualities of solid or semi-solid foods by retarding losses of moisture therefrom. Another specific object is to improve solid and semi-solid and other prepared foods by inhibiting biochemical changes that attend the process of becoming "stale."

Other objects of my invention are to provide new methods and new compositions for use in the preparation of foods having improved keeping qualities.

An especially valuable feature of this invention resides in the production of baked foods, and particularly of baked cereal foods, which can be preserved for longer periods than usual without either acquiring objectionable physical qualities by drying or developing a stale taste. The quick drying or staling or both of bread, for example, is a source of great trouble in the baking industries and of great economic waste, especially when the bread or similar baked cereal foods is marketed or stored in a sliced condition or with its protective crust otherwise broken. Consumers discard unused bread in large quantities because of deterioration in its tenderness or taste, and the demand for qualities of freshness is so prevalent that the unsold products of a day's baking often will not be accepted later by consumers and must be discarded or disposed of in a wasteful manner. My invention provides a way of alleviating these difficulties; and in its application to the making of bread and similar baked cereal foods it enables substantial economies to be realized in other respects.

I have discovered that the foregoing and other desirable objects and advantages may be attained by incorporating into food products a small proportion of a finely divided mineral substance characterics. Bentonite of the so-called occurring highly colloidal substance composed largely of the mineral montmorillonite. Chemically, bentonite may be classified as a hydrous aluminum silicate, but it differs from other substances in this class in that it possesses a unique plate-like molecular structure, pronounced base exchange qualities and other special physical characteristic. Bentonite of the so-called "swelling" variety, such as that obtained from the Black Hills region of Wyoming and South Dakota, is particularly suitable for use in carrying out the present invention.

I have found that bentonite is innocuous when used as a food, and that the incorporation of a small proportion of bentonite in foods which tend to deteriorate rapidly effectuates a very substantial improvement in their keeping qualities. This improvement is of two-fold nature: First, the bentonite acts to retain moisture in the food in such manner as to retard the drying and attendant changes of texture and other qualities that normally occur while the product awaits consumption. Second, the bentonite appears to inhibit biochemical or bacterial reactions which take place in the course of staling, so that the improved foods retain their original chemical qualities and taste for longer periods than usual.

Both of these phenomena may be utilized in some applications of this invention, while in other cases improved products may be prepared pursuant hereto for the primary purpose of retarding moisture losses and physical changes, or for the primary purpose of retarding biochemical changes which accompany staling processes, as the case may be.

Particularly valuable embodiments of the first type include those in which bentonite is incorporated in bread and in similar baked foods which are produced commercially in large quantities. The addition of a small amount of bentonite to dough prior to baking improves the moisture-retention of the product during baking, and the heat of baking does not impair the preservative action of the bentonite content upon the finished food. For use in this and similar embodiments hereof, a new flour composition may be provided which comprises flour having a small quantity, say between .25% and 1.50% by weight, of finely divided bentonite intimately admixed therewith. When such a composition is used or when the bentonite is added directly to the ingredients of a dough, the amount of bentonite employed generally is between .25% to 1.50%, by weight, of the total cereal or flour content of the dough. It is also advantageous in some cases to use the bentonite in composition with a minor proportion of an innocuous salt of acid reaction, in order that the slight alkalinity exhibited by bentonite in aqueous media may be counteracted by the acidity of the accompanying salt. Various inorganic salts may be used for this purpose, of which monocalcium phosphate is a preferred example, and food preservative compositions containing bentonite and having the pH reactions desirable in certain foods, such as bread, may be made with about 5% to 15% of monocalcium phosphate based upon the weight of the bentonite.

Bread prepared in the manner herein disclosed retains its freshness much longer than bread prepared from the same ingredients and in the same way except for the absence of added bentonite or a bentonite composition. The improved bread remains moist much longer and retains its desirable tenderness and taste longer than standard bread baked in the same way. The effect of the bentonite in retarding the staling of bread appears to result from the base exchange action or ionization of the bentonite and a tendency thereof to inhibit the splitting action of certain enzymes on the proteins or gluten in the bread. For example, bentonite inhibits the splitting action upon gluten of the enzyme papain, which tends to hydrolyze gluten more rapidly in the absence of bentonite. Bread made with a small amount of bentonite possesses qualities when baked equal to or better than those of comparable bread made with a small amount of potassium bromate, according to known practices, for the purpose of inactivating proteinases that tend to split the gluten.

According to other embodiments of my invention, I may prepare meat foods or other prepared protein-containing foods with a small content of bentonite or of a suitable bentonite composition to inhibit spoilage through enzymatic degradation of proteins in the food. Similarly, dairy products and edible foods which contain fats and oils may be improved in keeping qualities by the incorporation of a small proportion of bentonite therein. Various other embodiments of the invention will be apparent to those familiar with the art when they become apprised of this disclosure or of the usefulness and actions of bentonite as a preservative for foods as herein set forth.

When this invention is employed in the making of bread, the preparation and baking of the dough may be carried out substantially in accordance with usual recipes and procedures. If the well-known "straight dough" method is being used, the bentonite is incorporated in the dough at the time of mixing the other ingredients, after which the dough is allowed to ferment and is then baked. When using the "sponge dough" method, the sponge is prepared and fermented in the usual manner, and the bentonite preferably is incorporated in the dough making stage, i. e., when adding the remainder of the flour and other ingredients.

For the best texture, uniformity and other qualities in the product, the flour and the bentonite preferably are premixed, such as in the usual flour blending machine, and the bentonite is mixed in a finely pulverized state, preferably with particles as small as 200-mesh and in some cases small enough to pass through a 300-mesh or even finer sieve. Bentonite that has been freed from grit or other foreign matter is the best to use, and as already mentioned the bentonite desirably is added together with a minor proportion of an innocuous acidifying agent, such as monocalcium phosphate. For example, a composition containing, by weight, 90 parts of bentonite to 10 parts of finely divided monocalcium phosphate may be used.

The bentonite present in the dough enables the amount of yeast employed to be reduced as much as 20%, or the time of fermentation to be shortened proportionately. In many cases, the use of yeast food may be eliminated altogether by employing a slight additional time of fermentation, while in nearly all cases the quantity of yeast food may be reduced as much as 50% without adverse effects. I believe that these phenomena result from the pronounced colloidal properties of the bentonite and their effects in developing the gluten, rendering it more pliant, and reducing the work to be done by the yeast.

The advantages of this invention in bread-making have been demonstrated by comparative tests under commercial operating conditions, using, first, a standard procedure as a "control" run and, second, the same procedure modified according to my invention. For example, a straight dough made of high protein spring wheat flour was prepared, allowed to ferment four hours and baked according to a standard practice, and the resulting loaves were graded as standard. The moisture absorption of the dough, based on the weight of flour, was 67.2%; the dough was elastic, and its volume was measured as 3000 cc. Another straight dough was then prepared in the same manner and with the same materials, except that no yeast food was used and .75% of finely divided (200-mesh) bentonite was incorporated in the dough with the flour. This dough showed a moisture absorption of 70.1%; it also was elastic, and its volume was measured as 3010 cc. It was baked in the same manner as the standard, and the baked loaves were equal to the standard loaves with respect to color, texture, appearance, symmetry of form, color of crust, nature of grain and flavor, but they were superior to the standard with respect to moisture content and resistance to drying and staling.

Similar results were obtained in other comparative tests, for example, in the preparation and baking of a sponge dough, using .75% of a mixture containing 90 parts of finely divided bentonite and 10 parts of monocalcium phosphate, allowing the sponge to ferment 4½ hours, then incorporating the bentonite mixture together with the flour used in mixing the dough, and allowing the dough to ferment 20 minutes. The improved loaves were again equal to the standard loaves in texture, appearance, etc., but were superior to the standard with respect to moisture-retention and resistance to staling.

The following table illustrates the superior moisture-retention of bread made according to this invention as compared with standard bread baked at the same time under the same conditions. Both the standard loaves and the improved loaves were sliced and kept, unwrapped, in a breadbox of the type usually found in a home. Moisture tests were made at intervals as shown in the table, according to the standard procedure established by the American Association of Cereal Chemists:

| Time of Tests | Standard Loaves per cent Moisture | Improved Loaves per cent Moisture | Relative Humidity [1] at 12 noon on days of tests |
|---|---|---|---|
| 1 hr. after baking | 36.11 | 38.52 | 26 |
| 24 hrs. after baking | 32.71 | 35.60 | 21 |
| 48 hrs. after baking | 27.62 | 32.88 | 21 |
| 72 hrs. after baking | 24.43 | 30.86 | 18 |
| 96 hrs. after baking | 21.87 | 28.73 | 23 |
| 120 hrs. after baking | 19.55 | 26.51 | 29 |
| Averages | 27.05 | 32.18 | 23 |

[1] As determined by United States Weather Bureau.

The moisture content of the improved bread was higher after four days of exposure than that of the standard bread after two days of exposure.

It will be apparent to those skilled in the food industries that the quantity of bentonite to be used pursuant hereto may be varied according to the nature of the food or food ingredients with which the bentonite is incorporated; that various acidifying agents may be employed in conjunction with the bentonite for appropriate pH control; and that the invention as defined in the appended claims may be used to advantage to improve the keeping qualities of food products in general which present problems of quick deterioration, without restriction to the preferred embodiments described hereinabove except as may be required by the appended claims and the prior art.

I claim:

1. A baked cereal food containing an appreciable but small amount of bentonite.

2. The method of improving the keeping quality of bread and other baked foods which comprises incorporating a small quantity of finely divided bentonite into the food ingredients prior to baking.

3. The method of improving the keeping quality of bread and similar baked cereal foods which comprises incorporating into the dough prior to baking a small quantity of finely divided bentonite together with an innocuous salt of acid reaction in an amount sufficient to counteract the alkalinity of the bentonite.

4. The method of improving the keeping quality of bread which comprises incorporating into the dough prior to baking a small quantity of a mixture composed principally of finely divided bentonite and containing a minor proportion of monocalcium phosphate.

5. The method of improving the keeping quality of bread which comprises incorporating into the dough prior to baking finely divided bentonite in an amount equivalent to between .25% and 1.50% of the weight of flour in the dough.

6. The method of making bread which comprises making a sponge containing flour, water and yeast, fermenting the sponge, adding to said fermented sponge flour together with a small quantity of finely divided bentonite to form a dough, the quantity of bentonite being equivalent to about .25% to 1.50% of the total weight of flour in the dough, and baking the resulting dough.

7. A food preservative composition comprising a major proportion of bentonite and a minor proportion of an innocuous salt of acid reaction.

8. A food preservative composition comprising a major proportion of finely divided bentonite and a minor proportion of monocalcium phosphate.

9. As a new product of manufacture, bread having an appreciable but small amount of bentonite incorporated therein.

10. As a new product of manufacture, bread having bentonite incorporated therein in an amount between .25% and 1.50% of the weight of flour in the bread.

11. A new flour composition comprising flour having intimately admixed therewith an appreciable but small quantity of finely divided bentonite.

12. A new flour composition comprising flour having intimately admixed therewith from .25% to 1.50% by weight of finely divided bentonite.

13. A new flour composition comprising flour having intimately admixed therewith from .25% to 1.50% of a mixture composed principally of finely divided bentonite and containing a small proportion of an innocuous salt of acid reaction.

EUGENE G. HOLDEN, JR.

REFERENCES CITED

The following references are of record in the file of this patent:

UNITED STATES PATENTS

| Number | Name | Date |
|---|---|---|
| 778,166 | Biber | Dec. 20, 1904 |
| 1,524,783 | Curtner | Feb. 3, 1925 |
| 2,043,713 | Saywell | June 9, 1936 |
| 2,158,392 | Ament | May 16, 1939 |
| 2,254,241 | Pittman | Sept. 2, 1941 |

OTHER REFERENCES

Excerpt "Bentonite," from article "Silicon—The Element of a Thousand Uses," in Am. Jour. Pharm., Feb. 1932, (Bent. Lit.—167).

Certificate of Correction

Patent No. 2,443,138.                                                                                         June 8, 1948.

EUGENE G. HOLDEN, JR.

It is hereby certified that errors appear in the printed specification of the above numbered patent requiring correction as follows: Column 1, line 49, strike out "characterics. Bentonite of the so-called" and insert instead *known as "bentonite." Bentonite is a naturally-*; column 2, line 1, for the word "characteristic" read *characteristics*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*